United States Patent

McIntyre et al.

[15] 3,652,855

[45] Mar. 28, 1972

[54] RADIATION IMAGE AMPLIFIER AND DISPLAY COMPRISING A FIBER OPTIC MATRIX FOR DETECTING AND CODING THE RADIATION IMAGE PATTERN

[72] Inventors: John Armin McIntyre, 2316 Beistol St., Bryan, Tex. 77803; Dwight Proffer Saylor, 1220 Westover St., College Station, Tex. 77843

[22] Filed: May 26, 1969

[21] Appl. No.: 827,759

[52] U.S. Cl. ....................250/71.5 S, 250/83.3 R, 250/227, 340/172.5, 350/96 B

[51] Int. Cl. ....................G01t 1/20, G02b 5/14

[58] Field of Search ....................250/71.5 S, 227, 83.3 R; 340/172.5; 350/96

[56] References Cited

UNITED STATES PATENTS

| | | | |
|---|---|---|---|
| 3,244,894 | 4/1966 | Steele et al. | 250/227 |
| 3,267,283 | 8/1966 | Kapany | 250/227 X |
| 3,467,774 | 9/1969 | Byrant | 250/227 X |
| 3,509,341 | 4/1970 | Hindel et al. | 250/71.5 |
| 3,308,438 | 3/1967 | Spergel et al. | 340/172.5 |

*Primary Examiner*—Archie R. Borchelt

*Attorney*—Robert S. Dunham, P. E. Henninger, Lester W. Clark, Gerald W. Griffin, Thomas F. Moran, Howard J. Churchill, R. Bradlee Boal, Christopher C. Dunham and Thomas P. Dowd

[57] ABSTRACT

A radiation image amplifier is disclosed comprising a fiber optic matrix for detecting and coding the radiation image pattern and photosensitive amplifying means for converting the coded image into electrical signals which are amplified and then utilized by decoding to produce an enlarged and intensified image display. The fiber matrix is coded in such manner as to minimize the size of the photosensitive amplifying means.

14 Claims, 8 Drawing Figures

INVENTOR.
JOHN A. McINTYRE
BY DWIGHT P. SAYLOR

Thomas J. Moran
ATTORNEY

INVENTOR
JOHN A. McINTYRE
DWIGHT P. SAYLOR
BY
Thomas J. [signature]
ATTORNEY

INVENTOR.
BY JOHN A. McINTYRE
DWIGHT P. SAYLOR

Thomas F. Moran
ATTORNEY

RADIATION IMAGE AMPLIFIER AND DISPLAY COMPRISING A FIBER OPTIC MATRIX FOR DETECTING AND CODING THE RADIATION IMAGE PATTERN

BACKGROUND OF THE INVENTION

The present invention relates to the field of electronic image display and more particularly to a system for detecting and electronically amplifying radiation images utilizing fiber optic coding.

It has long been a problem in both the photographic and electronic image-producing art to detect small weak images and reproduce them in enlarged intensified form. Various electronic devices have been developed, such as television cameras and image intensifier tubes which accomplish this end to some degree. However, while the television camera can give output pictures of sufficient size and brightness, it is limited by its sensitivity in detecting signals of comparative weakness. Conversely, image intensifier tubes which are capable of detecting weak image signals are limited by the size and brightness obtainable in their output pictures. Although systems could be built with existing equipment to accomplish the desired result, those which have as yet been suggested have been found to be impractical in the commercial market because of their necessary size and expense.

The present invention provides a practical system which combines the desirable qualities of both the television camera and the image intensifier tube and embodies an image amplifying device of improved sensitivity and spatial resolution which can detect a small weak radiation image and convert it to an output picture of any desired size and brightness.

SUMMARY OF THE INVENTION

The system of the present invention produces an enlarged and intensified picture of a radiation image by detecting and coding the radiant energy or particles comprising the image pattern in terms of electrical signals which are amplified and then decoded for utilization and display. The system comprises an image-transmission section, which picks up the image as a light pattern and codes it for presentation to an electrical converter section, which converts the coded light image to electrical signals that are then amplified and by decoding and reconverting the amplified electrical signals in a utilization section, an enlarged and intensified visual display of the original image is obtained.

More particularly, the image transmission section is in the form of a fiber optic array and the electrical converter section may be a bank of photomultiplier tubes or similar photosensitive amplifier means. The fibers transmit light from unit areas of the image to the photo multipliers in such manner as to produce distinctive signals or "addresses" for each unit area in the image field. By properly matrixing the fibers, the number of photomultiplier tubes required to achieve the desired addressing is minimized.

The proper matrixing is accomplished by positioning the fibers with their input ends arranged in a matrix with one, or a given number, covering each unit area or spatial location on the field of the image to be detected. Each of the individual fibers in a given unit area is connected to a different photomultiplier tube in the bank but fibers from different areas are connected to the same tubes in different combinations. The number of photomultiplier tubes required in a given system will depend on the number of fibers at a unit area and the number of unit areas being monitored, but with this matrixing method, the required number of photomultiplier tubes can be many orders of magnitude less than the number of spatial locations being monitored.

The radiation image which is thus electrically coded can then be amplified and otherwise processed in a utilization section. A discriminator circuit is disclosed for use in decoding the amplified electrical image and presenting it for visual display on a cathode ray oscilloscope.

DETAILED DESCRIPTION OF THE DRAWINGS

Figures 1, 2:
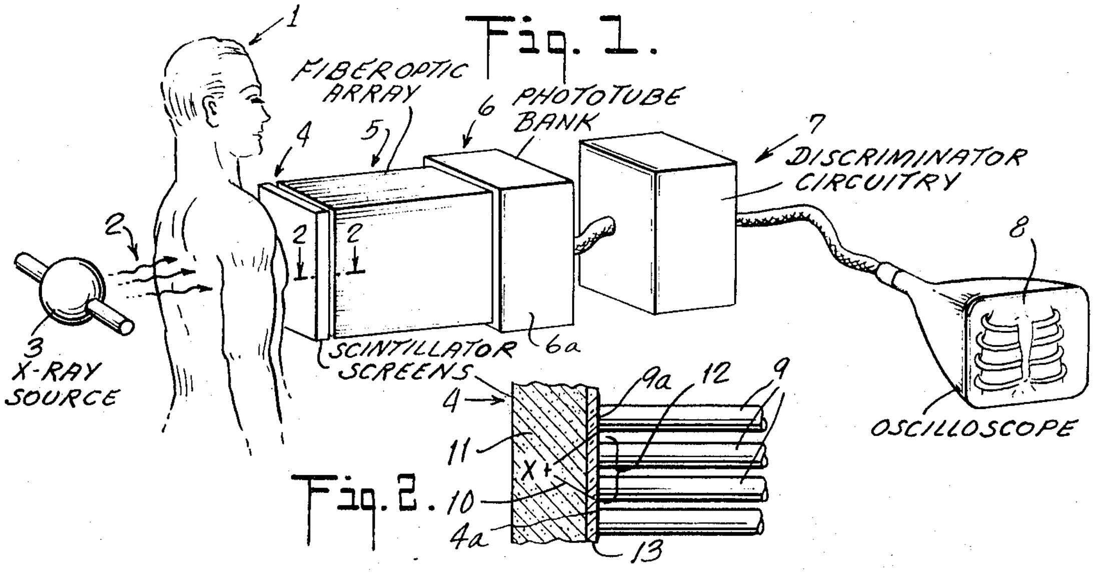
FIG. 1 is a diagrammatic view of the system of the present invention being used in combination with a diagnostic X-ray apparatus.
FIG. 2 is an enlarged view of a portion of the system shown in FIG. 1, illustrating the image-detecting fiber array picking up a light signal from a scintillation screen.

The system of the present invention is capable of use in almost any application where it is desired to detect a comparatively small or weak radiation image and present an enlarged, intensified image display. The term "radiation" as used herein will be understood to refer to both electromagnetic energy and particles.

A particular embodiment will be described for use in connection with a diagnostic X-ray device in which application the system provides a simultaneous, detailed oscilloscope display of the X-ray pattern. Such an embodiment is shown diagrammatically in FIG. 1, wherein a patient 1 is depicted being subjected to radiation 2 from a source 3 of X-rays. The X-rays in passing through the patient 1, or other subject being irradiated, are variously absorbed and diverted so that a peculiar pattern of radiation indicative of the internal structure of the subject appears on the opposite side from that receiving the radiation 2. In the conventional diagnostic X-ray system, the radiation pattern or image upon passing through the subject is detected by a photographic plate. The plate is then developed and provides a photograph of the internal structure of the subject that was viewed. When used in this application, the system of the present invention records images of X-rays and other radiations just as the photographic plate, but is capable of a sensitivity several hundred times greater than that of the plate and further can enlarge and intensify the image for simultaneous display during exposure.

As the radiation image for processing by the system of the present invention is preferably in the form of a photon pattern when used for the present application, the photographic plate is replaced by a scintillation screen 4, such as one comprising NaI(Tl), which is suitable for detecting X-rays. The X-ray radiation pattern upon passing through the patient 1, is intercepted by the scintillation screen 4 which converts the radiation into an appropriate pattern of light signals. The light signal pattern is then ready for processing by the system of the present invention.

The system operates generally in the following manner. The light signals are picked up and transmitted by an image-transmission section 5 which consists of a series of optical fibers having their input ends arranged in a matrix and their opposite ends connected to an electrical converter section 6. The electrical converter section 6 comprises a number of photosensitive components, such as a series of photomultiplier tubes positioned in a bank 6a. The fibers are matrixed in such manner that the light from each small unit area on the scintillation screen 4 is coded to produce a distinctive signal or "address" by energizing combinations of photomultiplier tubes in the bank. The addressed signal is amplified by the photomultiplier tubes and other appropriate means and fed to a utilization section 7 containing, for example, a discriminator circuit which presents each signal as a spot on an oscilloscope display 8 at a relative location corresponding to the location of the sensed light signal on the scintillation screen 4.

The particular features of system operation will be best understood by considering each section of the system in greater detail.

IMAGE TRANSMISSION SECTION

FIG. 2 shows in detail the input point of the system of the present invention, that is, the input end of the optical fiber arrangement. The input ends of the fibers 9 are arranged in a planar matrix 9a and are attached to the output face 4a of the scintillation screen 4. When an X-ray causes a scintillation as at point X, light 10 is transmitted to the output face 4a of the screen 4. The X-rays striking the scintillator material 11 produce scintillations which release photons approximately at the rate of 10 per every kev. of energy deposited in the scintillator material 11. As X-rays used in medical work are in the 100 kev. range, there are about 1,000 photons produced by each X-ray stopped in the scintillator material 11. Therefore, the light 10 will ordinarily contain about 1,000 photons. The resulting photons are picked up by the particular optical fibers whose ends are within the base of a cone formed by the light 10 since the optical fibers 9 accept only a narrow cone of light, (about 6 percent of the light emitted by the scintillator material 11.) Thus, approximately 60 photons are transmitted by the fibers for each scintillation. Furthermore, these 60 photons will be divided among as many fiber ends as are contained in the base of the cone 10 so that the number of photons transmitted by each fiber 9 will be even less than 60.

By way of comparison, if a television camera were to be used at the output face 4a of the scintillation screen 4 to pick up the scintillation image, at the X-ray energies used here, approximately $10^4$ X-rays per square centimeter per second would be required just to reach the noise level of the image orthicon tube. While image intensifier tubes can detect signals far below this level, their output brightness is not sufficient for viewing under ordinary conditions unless about $10^5$ X-rays per square centimeter per second strike the input of the intensifier. Further, the maximum size of an image which is capable of being picked up by a television tube is about 1.6 inches in diameter and, while somewhat larger for the image intensifier tubes, the system of the present invention can be adapted to detect images with diameters up to 20 or more inches in size.

To achieve the maximum amount of transmission in a given fiber 9, it will be seen from FIG. 2 that it is desirable to arrange the thickness of the scintillator material 11 such that the diameter of the base of the cone 10 is equal to the diameter of a spatial location 12 containing a given number of fiber ends. As it is necessary to interpose a window between the hygroscopic NaI(Tl) scintillator material and the fibers, the thickness of the window 13 must be considered along with the thickness of the scintillator material 11 in achieving the desired cone diameter. It may be geometrically determined that the scintillator material thickness should be 2.5 times the diameter of the spatial location and the window thickness should be 0.8 times that diameter. Thus, for a spatial location 12 of diameter 0.005 inches, which will give reasonable spatial resolution, the scintillator material thickness should be 0.013 inches and the window thickness about 0.004 inches.

CODING

Figure 3:
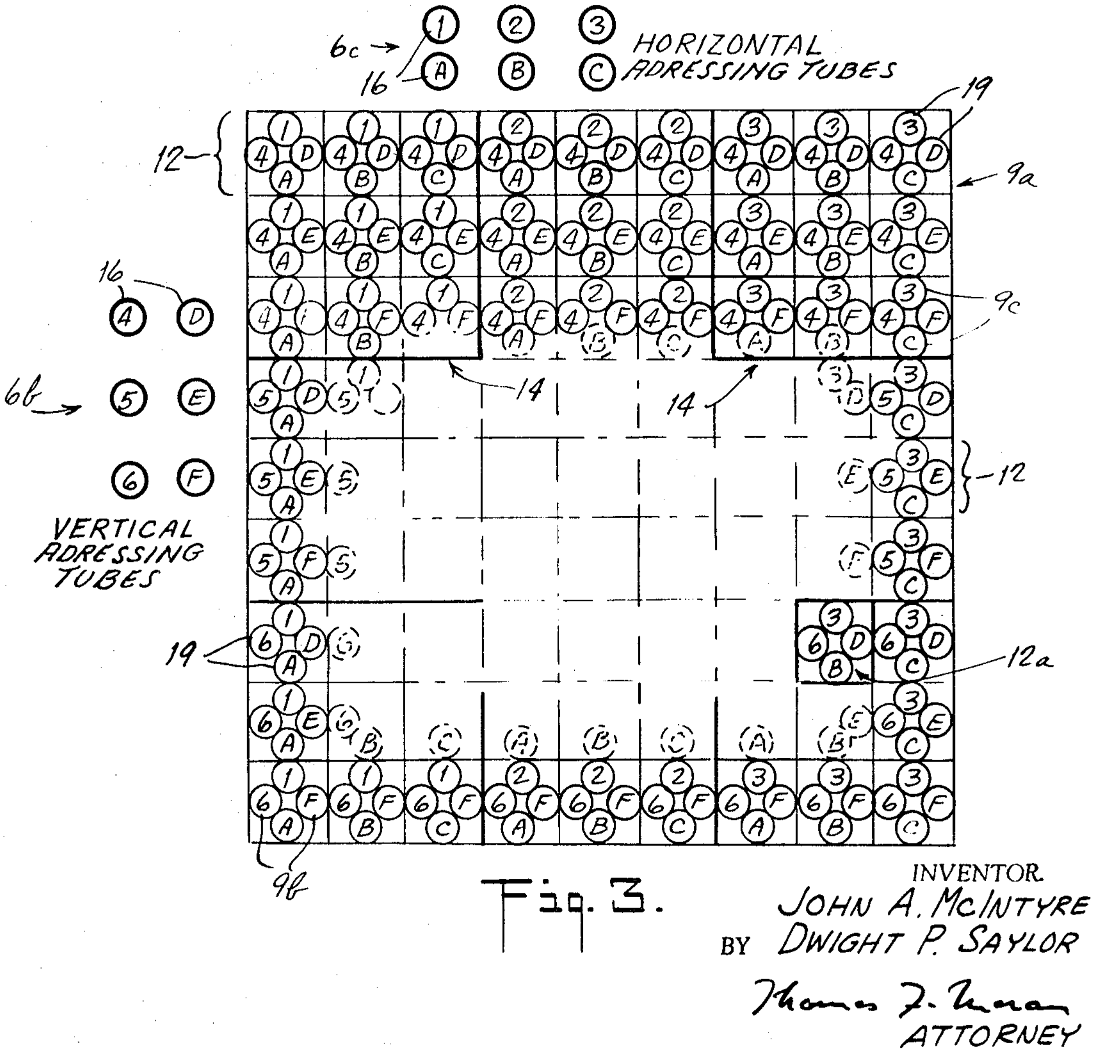
FIG. 3 is a diagrammatic view illustrating the matrixing arrangement for connecting the fibers to the photomultiplier tube array.

A method of matrixing the fibers 9 and connecting them to the electrical converter section 6 is illustrated in FIG. 3. The image is coded by arranging the fibers 9 in such a manner that each spatial location 12 on the output surface 4a of the scintillation screen 4 will have a distinctive "address." This permits each addressed light signal to be converted into corresponding electrical signals which may be amplified and otherwise processed and then used to return the reconverted signal to its own address on the ultimate image display.

As seen in FIG. 3 the input surface 9a of the fiber arrangement may be divided into a number of spatial locations 12 or unit areas which we will call "bins." The image converter section 6 is composed of a number of photomultiplier tubes 16 arranged in the bank 6a consisting of a vertical addressing section 6b and a horizontal addressing section 6c.

Each bin 12 contains the ends 19 of at least two fibers 9, one of which is used for the horizontal address and one for the vertical address of the bin 12. When only two fibers are used per bin, each horizontal row and each vertical column of bins is provided with a given photomultiplier tube in the bank 6a and all the vertical addressing fibers in a particular horizontal row of bins are connected to the same photomultiplier tube in the vertical addressing section 6b of the bank 6a, and all the horizontal addressing fibers are similarly connected to the tubes in the horizontal addressing section 6c of the bank 6a. Thus, when a given bin 12 receives a light signal, two photomultiplier tubes 16 will be activated, one in the vertical addressing section 6b of the bank 6a indicating the vertical column and the other in the horizontal addressing section 6c of the bank indicating the horizontal row in which the bin 12 is located. The two tubes, therefore indicate the exact address of the bin 12 in the two-dimensional field.

For an input surface 9a having nine bins 12 on a side, such as that shown in FIG. 3, the number of photomultiplier tubes 16 required for addressing all the 81 bins, using two fibers per bin, would be 18. However, the number of fibers per bin shown in FIG. 3 is four, two fibers 9b for vertical and two fibers 9c for horizontal addressing. With two fibers available for addressing a bin in each direction, the two fibers can be connected to two different photomultiplier tubes in the appropriate section of the bank 6a in distinctive combinations which permit fewer photomultiplier tubes 16 to be used in each section of the bank 6a while still providing a characteristic address for each bin 12. Thus, as illustrated in FIG. 3, using four fibers per bin, an input surface 9a of nine bins 12 on a side can be fully addressed using 12 photomultiplier tubes 16. Each photomultiplier tube 16 is identified by a number 1 through 6, or a letter, A through F, and the fibers 9 attached to the respective photomultiplier tubes 16 are indicated by the corresponding number or letter on their ends 19.

There are definite relationships between the number of light fibers per bin, the number of photomultiplier tubes, the method of coding, and the dimensions of the input surface. Each unit area or bin 12 on the input surface 9a will contain an even number $n$ of fiber ends 19, $n/2$ of which will be used for horizontal addressing, and $n/2$ of which will be used for vertical addressing. In forming the input surface 9a, the matrix may be built up of basic unit squares (such as 14 in FIG. 3) having N bins on a side. The number of photomultiplier tubes P required to address such a matrix will be $n$N, that is, N$n/2$ for the horizontal bank, N$n/2$ for the vertical bank. However, by connecting the photomultipliers and fibers in various combinations, as described, the number of bins which can be addressed by N$n$ phototubes is $N^n$. Thus if P photomultipliers will fully address the bins in a matrix of $N^n$ bins, then for a matrix having T bins on a side, the relationships may be expressed mathematically as:

$$P = nN \quad (1)$$

and $$T = N^{n/2} \quad (2)$$

Accordingly, for the case of two fibers per bin ($n$=2) and nine bins per unit square ($N$=9), as cited above, the number of photomultiplier tubes Nn required for addressing is 18, while the number of bins $N^n$ is 81. For the system shown in FIG. 3 where $n$=4 and $N$=3, the number of photomultiplier tubes 16 required will be 12, and with this number of tubes a matrix having nine bins on a side or 81 bins may be used and still permit individual addressing of each bin 12.

It will be seen that input surfaces of widely varying areas may be produced. However, the area of the input surface is limited by the area of the photosensitive surface available on the photomultiplier bank, since each light fiber on the input surface terminates at its other end on the surface of a photomultiplier. Thus, the output surface of the scintillation screen, the input surface of the fiber matrix, and the photosensitive surface of the photomultiplier bank will have the same dimensions for the most efficient use of the photomultipliers. To optimize the size and expense involved in building a given system, the following relationships must be considered.

If the linear dimension of the side of a single bin on the input surface is $d$ then the length $s$ of a side of the input surface is the number of bins on a side, T, times $d$, or using the relationship of equation (2), $$s=dN^{n/2} \qquad (3)$$

The total area available on the surface of the photomultiplier bank will be the area A of the surface of one photomultiplier times the number of photomultipliers $P$. Now, if we consider L to be the maximum value possible for s given $P$ photomultipliers, then $L^2$ equals PA, or substituting from equation (1):

$$L^2 = NnA \qquad (4)$$

Combining equations (3) and (4) provides an expression for the maximum size L obtainable for an input surface in terms of $d$, the size of an individual bin, $n$, the number of fibers therein, and $A$, the unit surface area of a photomultiplier connected to the fiber ends:

$$L=\left(\frac{nA}{d^{2/n}}\right)^{\frac{n}{2(n-1)}} \qquad (5)$$

Figure 3A:
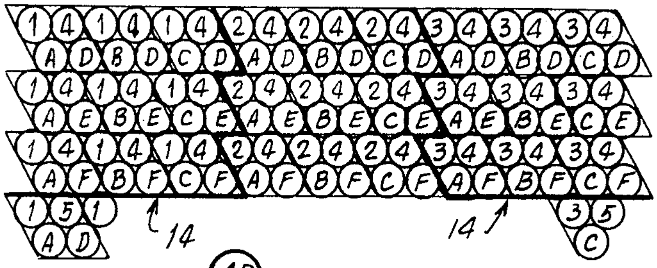
FIG. 3*a* is a modification of the arrangement shown in FIG. 3 intended to achieve improved image resolution.

The arrangement of the fiber ends shown in FIG. 3 is primarily illustrative and it will be seen that the large spacing between the fibers in respective bins will give comparatively poor image resolution. In an actual matrix, the fibers may be packed together as tightly as possible in an arrangement such as shown in FIG. 3*a*. This packing arrangement minimizes the bin size and hence gives the best resolution obtainable.

It will also be understood that the input surface may be formed in configurations other than a square and that the surface may be curved as well as planar.

IMAGE CONVERTER SECTION

The arrangement of the image converter section 6 will now be considered and while most photoelectric sensors would be adaptable for use in the detector bank 6*a*, from the standpoint of sensitivity and expense, the best adapted available component is probably the conventional 931A photomultiplier tube whose photosensitive surface area, A, is 0.3 in.$^2$. As previously indicated, a value for $d$ of 0.005 inches will give a reasonable spatial resolution. Using these values and the relationships in equations (2), (4), and (5), values for $P$ and $L$ are respectively plotted, as curves 15 and 17 in FIG. 4, for various values of $n$.

Figure 4:
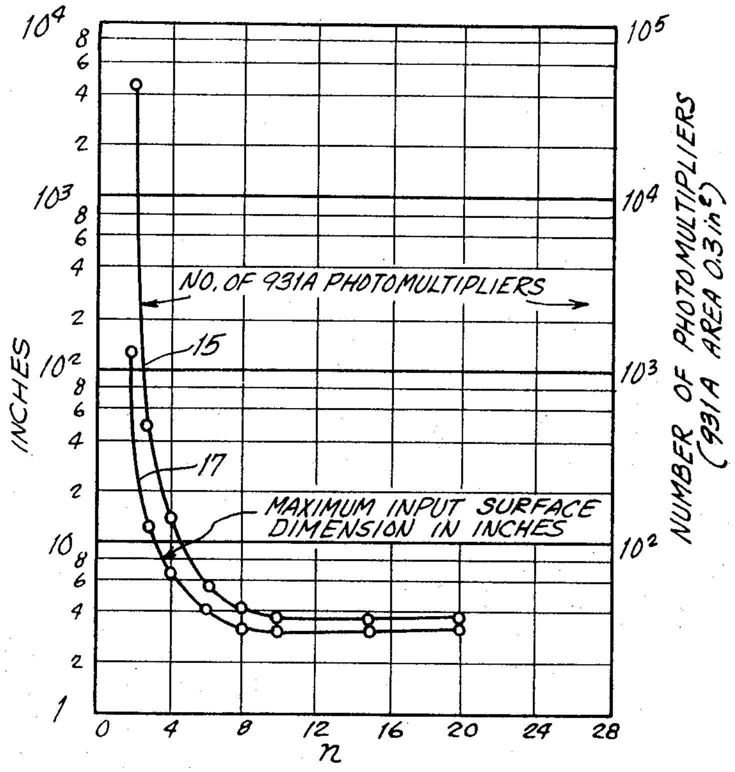
FIG. 4 is a plot showing the size of the input or photosensitive surface and the number of photomultipliers required as a function of the number of fibers in a unit area of input surface.

It will be noted upon studying FIG. 4 that as $n$ is increased the size of the input surface ($L$) drops to a few inches. The number of photomultipliers $P$ drops even more rapidly since $P=L^2/AwA$. From an expense standpoint then, the cost of the photomultipliers becomes comparatively unimportant for values of $n$ of four or greater, so that matrices with $n=4$ would seem to be preferable where cost is an important consideration. One limiting factor in choosing $n=4$, however, is that for the dimensions we have selected the maximum linear dimension $L$ of the input surface is 6.6 inches on a side. If a larger input surface is desired, for example, 20 inches on a side, it would be necessary to select $n=2$ or else build a larger matrix using nine input surfaces of 6.6 × 6.6 inches each. In the latter case, the number of photomultipliers required will be nine times that required for a 6.6-inch surface. Since the number of photomultipliers required for the 6.6-inch surface, as indicated on the plot in FIG. 4, is 145, 9 times that figure or 1,305 photomultipliers would be required for the 20-inch surface using $n=4$. On the other hand, using $n=2$ to obtain the 20-inch input surface, the arrangement would be truncated from its maximum dimension of $L=120$ inches. Since from (1) $P=nN$ and from (3) $s=dN^{n/2}$, then when $n=2$, $P=2s/d$. Thus, a reduction of $s$ by a factor of 6 to 20 inches reduces $P$ by the same factor to a value of 8000. By comparison, the $n=4$ system is more desirable.

A more efficient use of photomultipliers may be achieved by using tubes having a larger photosensitive area A such as the conventional 2 inch-diameter end-window photomultipliers. From equation (5), when $n=4$, $L$ is proportional to $A^{2/3}$, so that if conventional 2 inch-diameter photomultipliers are used instead of the previously mentioned 931A photomultipliers, $L$ will increase by a factor of 4.6 and input surfaces with linear dimensions up to 30 inches would be feasible.

Figure 5:
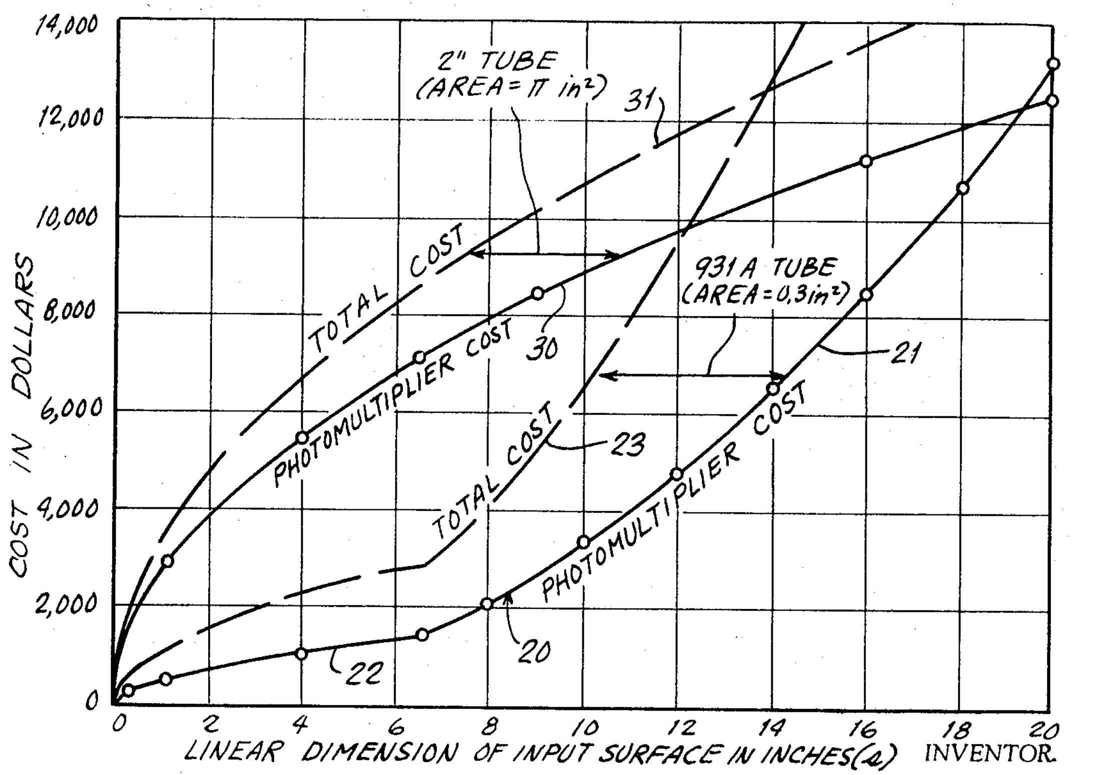
FIG. 5 is a plot of the comparative costs of systems using 0.3 $in.^2$ internal cathode photomultipliers and 2 in. diameter end-window photomultipliers, as a function of the size of the input image surface.

The comparative expense of obtaining surfaces of different linear dimensions are plotted in FIG. 5. It has been assumed that the photomultipliers of 2 inch-diameter are approximately 5 times the cost of the 0.3 in.$^2$ 931A tubes, so that the price of the smaller tubes have been put at $10 each and the larger ones at $50 each for the purposes of the plot.

It will be seen that the solid curve 20 indicating the cost of the 931A photomultipliers has two portions 21 and 22. One portion 21 indicates the cost for $s$ greater than 6.6 inches but less than 20 inches in accordance with the formula:

$$\text{Cost}/10 = P=(s/6.6)^2 0.145 = 3.32s^2 \qquad (6)$$

This follows since the number of 6.6 inches × 6/6 inches surfaces required depends on $s^2$.

The other portion 22 of curve 20 covers the situation when $s$ is less than 6.6 inches, since then the relationship is that of equation (3), that is $s=dN^2$. Since $P=nN=4N$ this portion of the curve is expressed as:

$$\text{Cost}/10 = P = 4(s/d)^{1/2}=56.4s^{1/2} \qquad (7)$$

The curve 20 for the 931A tube cost accordingly rises slowly to a value of $1,450. for less than 6.6 inches and then increases as $s^2$ to a value of $13,280, for $s=20$ inches.

The curve 30 for the 2 inch-diameter photomultipliers covers the situation where $s$ is less than 30 inches and varies in accordance with the formula of equation (7) except that $P$=cost/50 instead of cost/10.

Comparison of the curves 20 and 30 in FIG. 5 shows that the use of the larger photomultipliers is less expensive only when using the largest input or photosensitive surfaces. However, a further consideration which must be taken into account is the cost of the electronic equipment associated with each photomultiplier tube in a bank. The present cost of such equipment per tube is approximately the same as the cost of a 931A photomultiplier tube. Therefore, the cost of a system using the 931A photomultiplier tubes is twice that already considered, while a system using the larger 2 inch-diameter photomultiplier tubes will cost only 20 percent more. The dashed curves 23 and 31 respectively indicate the total costs of systems using the smaller and larger surface area tubes. It will be seen upon considering the curves 23 and 31 that for input surfaces under 14 inches the 931A tubes are more economical, while for larger input surfaces the larger, 2 inch-diameter tubes are preferable.

Again considering equation (3), it will be seen that for a given coding system, that is, with $n$ and $N$ fixed, the size of the input surface L is proportional to the bin linear dimension $d$, so that a larger input surface can be achieved at the expense of the spatial resolution. The cost can thus be decreased by decreasing the spatial resolution, that is, increasing $d$. *For example, for an input surface having* $n=4$ and s fixed, then from equation (3) $N^2=s/d$ and from equation (2) $P=nN=4N$ so that combining these relationships $P = 4\,(s/d)^{1/2}$. Thus $P$ decreases only as the square root of the bin size. Therefore, to decrease the cost by a factor of 2, the bin size of the input surface must be increased by a factor 4 to 0.02 inches. Conversely, to improve the resolution by a factor of 4, the photomultiplier cost need only be doubled.

In operation, the image converter section 6 converts the detected radiation image pattern which has been coded by the image transmission section 5, into electrical signals. The electrical signals may then be amplified, as occurs within the photomultiplier tubes and their associated amplifiers and transmitted for further processing. It will be seen that each of the electrical signals represents a particular minute portion of the radiation pattern detected, so that the pattern may be dealt with in any manner in which it is possible to deal with an electrical signal. The pattern may thus be amplified, analyzed, further coded or attenuated during the course of the processing. The electrical signals may be stored in a computer or stored in a permanent form such as magnetic tape, or as shown in FIG. 1 fed simultaneously to a utilization section 7.

UTILIZATION SECTION

While the electrical signals may be utilized in many different ways, for the purposes of the presently described embodiment, the signals are used to reproduce the radiation image simultaneously on a cathode ray oscilloscope 8 display.

Figure 6:
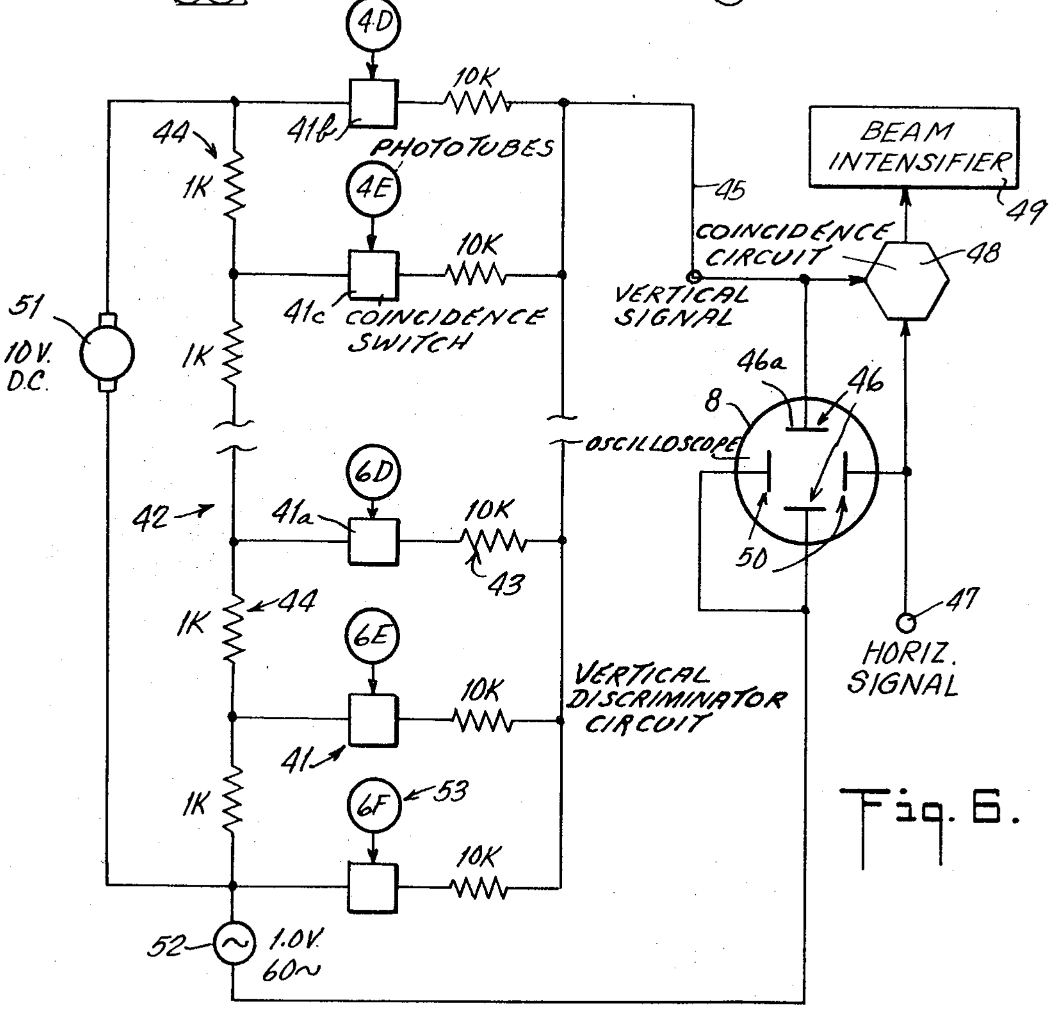
FIG. 6 is a circuit diagram of a system for decoding the radiation image for display on a cathode ray oscilloscope.

A particular system for decoding the electrical signals so as to present the image pattern on the screen of the oscilloscope 8, is shown in FIG. 6 in the form of a discriminator circuit 40.

For the sake of clarity only the portion of the circuit for decoding the signals in the vertical photomultiplier bank is shown and will be described, but it will be understood that an identical circuit may be used to decode the signals in the horizontal photomultiplier bank.

The circuit 40 comprises an array of electronic switches 41, connected at equal intervals in a voltage divider network 42, and each is in series with a 10 kohm resistor 43. Each leg of the voltage divider network contains a chain of 1kohm resistors 44, and the output 45 of the network is connected to the vertical deflection plates 46 of the oscilloscope 8.

The network output 45 is also connected, in common with the output 47 of the horizontal discriminator circuit, to a coincidence circuit 48, whose output operates a beam intensifier 49 in the cathode ray oscilloscope 8. The output 47 of the horizontal discriminator circuit is also connected to the horizontal deflection plates 50 of the oscilloscope 8. A 10-volt DC power source 51 is connected across the voltage divider network 42 and a small 60-cycle alternating voltage source 52 of about 1 volt AC is connected between the network 42 and the vertical deflection plate *46a*. Each of the electronic switches 41 is connected to two photomultipliers in the vertical bank and will be actuated by coincident signals from the respective photomultipliers. The particular photomultipliers connected to each switch are indicated by the number and letter in the circles 53 in FIG. 6.

In operation, if a scintillation occurs, for example, opposite the bin in the input surface *9a*with a horizontal coordinate of 3B and a vertical coordinate of 6D, it will be seen that the respective photomultipliers connected to the bin will produce coincident output signals. The coincident signals from photomultipliers 6 and D will then close the associated electronic switch 41*a* in the vertical discriminator network for a microsecond. The closing of the switch 41a then applies the potential of the 1kohm voltage divider chain through the output 45 to the vertical deflecting plates of the oscilloscope 8. Since the switch 41 a, is in the third leg of the nine legs in the circuit, the output potential from the voltage divider will be (3/9) × (10) volts. With the oscilloscope 8 adjusted so that a 10-volt pulse will deflect a beam spot to the top of the screen, the closing of switch 41*a* has the effect of deflecting the spot upward in an amount equal to 3/9 of the vertical dimension of the screen.

At the same time, the excitation of photomultipliers 3 and B in the horizontal bank will result in a signal which deflects the oscilloscope beam spot to the right a distance equal to 8/9 of the horizontal dimension of the screen and since the horizontal and vertical signals occur at the same time, the coincidence circuit 48 is fired and the oscilloscope beam intensifier 49 is activated. The beam spot thus appears at a point where the vertical deflection is 3/9 of full value and the horizontal deflection is 8/9 of the full value, thereby giving a bright spot at these coordinates for one microsecond. The spot on the oscilloscope screen thus corresponds to bin **12*a*** in FIG. 3.

In this manner, the position of a light flash in the image pattern is transferred to a relatively equivalent position on the face of the oscilloscope 8. Since the intensity of the oscilloscope spot can be made as large as desired, a light flash of 60 photons in the scintillation screen 4 is transferred to a flash on the oscilloscope screen of arbitrarily high intensity.

As the light flash in the scintillator material lasts only about one microsecond, the electrical signals applied to the vertical and horizontal deflection plates of the oscilloscope 8 are of the same duration and the oscilloscope spot is deflected to the correct horizontal and vertical position and intensified for only that period. The spot then returns to the zero position on the screen without intensification to await the next pair of deflections. Confusion in the plotting of the scintillations on the oscilloscope screen will occur only if the light flashes occur at a rate approaching 1,000,000 per second. Such a high counting rate is not necessary to produce a satisfactory picture on the oscilloscope 8.

The discriminator circuit 40 in FIG. 6 has been designed also to accept simultaneous signals from several bins in the vertical bank. In such a case it is desired that the deflection of the oscilloscope spot correspond to the average location of the several bins excited. This capability is not extremely important for use with the present system since, as previously mentioned, at energies in the 100 kev. range, about 60 photons will be produced per scintillation. These 60 photons will be divided among $n$ light transmitting fibers, so that $60/n$ photons will be transmitted by each fiber to a photomultiplier. As the efficiency of a photomultiplier is about 10 percent for converting photons to electrons inside the photomultiplier tube, only $6/n$ photoelectrons will be produced in each tube on the average. With $n$=4 then, 1.5 photoelectrons will be produced in each photomultiplier on the average.

While the number of photons available at X-ray energies in the 100 kev. range is not very large and hence the photoelectrons in the photomultipliers is quite small so that not much averaging of position can be accomplished, such averaging could be used at higher energies where the number of photoelectrons would be proportionately higher. This can occur with higher energy gamma rays, such as the 360 kev. iodine gamma rays used for thyroid diagnosis in medical treatment. A thicker scintillation material can then also be used and the cone of photons might then be spread over several bins so that several vertical addressing fibers would receive photons simultaneously.

The discriminator circuit will then operate as follows: Assuming that photomultipliers 4, D and E are excited and close their associated electronic switches **41*b* and 41*c*, a potential of (1/9)× (10) volts will then appear across the two adjacent 10 kohm resistors, and the oscilloscope upper vertical deflection plate 46*a* at the common connection of the 10 kohm resistors will achieve a potential halfway between the two voltages applied. Thus, the detection of light by the fibers in the two bins accordingly energizing photomultipliers 4, D and E, produces a potential on the oscilloscope upper vertical deflection plate 46*a*** that is the average of the potential that would be produced by light detected in either of the bins alone. This averaging is exactly what is desired. It will be seen that if three bins detect photons, the average of the separate potentials resulting will also be applied to the oscilloscope upper vertical deflecting plate *46a*.

The disclosed circuitry thus has the desirable feature that the spot location on the oscilloscope 8 will be determined by the average position of the photons collected by the different bins. Therefore, the loss in resolution produced by the separating of the photons over a number of bins is avoided. In addition, the small alternating voltage source 52 produces a voltage with an amplitude that will oscillate the oscilloscope spot a small vertical distance in order to smooth out the coarseness in the image display which may be introduced by the size of the bins.

Figure 7:
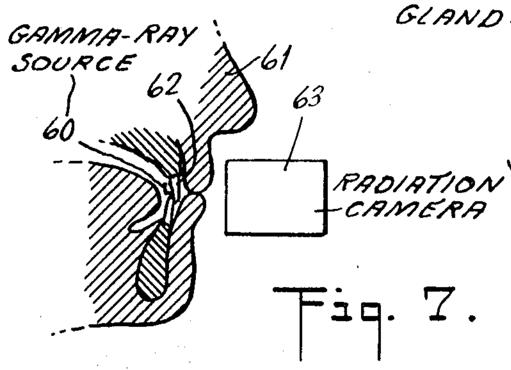
FIG. 7 is a diagrammatic view of the system of the present invention being used in combination with a small radioactive source in a dental diagnostic application.

It will be realized by those skilled in the art that the image amplifier system of the present invention may be modified in various ways to adapt it to other applications. For example, the high sensitivity of the system will permit the substitution of a small harmless radioactive source emitting gamma rays for the X-ray machine in many diagnostic applications. As shown in FIG. 7, a dentist could place a small radioactive source 60 in the mouth of a patient 61 and detect the "X-ray" pattern of the teeth 62 using an image amplifier system 63 of the present invention.

Figure 8:
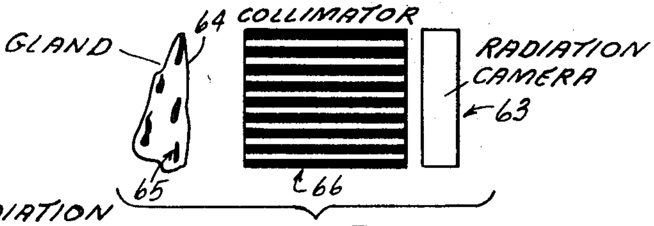
FIG. 8 shows a collimator device for use in a further diagnostic application.

Another application of this image amplifier system 63, is to determine the location and intensity of weak radioactive sources such as the iodine radioactivity found in a thyroid gland 64 under medical treatment. In such an application, as shown in FIG. 8, it is necessary to correlate a position in the system 63 with a position in the radioactive source 65. One method of achieving this is to place a collimator 66 with many apertures between the source 65 and the system 63. For such a collimator to be effective, its apertures must be aligned with the fiber ends in the input surface. A collimator of such character could be constructed using fibers of the same size as those used in the image amplifier.

Although an image amplifying system has been described for the detection and location of X-rays and gamma rays, the use of the system is not limited to the applications just discussed. For example, neutrons can be detected instead of X-rays by using the proper scintillation detector. Thus, "-neutron photographs" can be obtained as well as "X-ray photographs". Or, electron images such as those occurring in an electron microscope can be amplified. Other charged or neutral particle images can also be processed.

As already mentioned, one great utility of the image amplifier is that the image is coded in electrical pulses. In some applications, such as the photography of bubble chamber pictures in high energy physics experiments, a very large effort is required to so code the usual optical photographs for processing by the computer. The image amplifier described above can be used for this application provided the light signal to be detected arrives at only one or several adjacent bins at a time in FIG. 3. This requirement can be satisfied by scanning the bubble chamber with a narrow light beam so that the light signals arrive sequentially at the different bins in the image plane.

It will be seen therefore that the radiation image which the present system can accommodate may consist of patterns of electromagnetic radiation, such as X-rays, or gamma rays; or of charged particles such as electrons, protons, alpha particles, charged atomic nuclei, pi or mu mesons, other mesons, or strange particles such as the sigma particle, and the like; or of neutral particles, such as neutrons, neutrinos, mesons, or strange particles, such as the lambda particle and the like; or of light in the form of photons which strike the input fiber ends in time sequence.

A system is thus presented which may be used to detect and process any type of radiation image, whether in a pattern of radiant energy or particles, and of various sizes and intensities, and to reproduce the detected image in various forms including an enlarged intensified display. This system, of improved versatility over the devices of the prior art, is achieved, while minimizing size and expense.

What is claimed is:

1. In an apparatus for analyzing a radiation image of the type comprising:

a. input means for acquiring radiation in the pattern of the image to be reproduced and for separating said pattern into a plurality of discrete elements;

b. coding means for conducting said elements from said input means and coding them in combinations indicative of their relative positions in said pattern;

c. output means for receiving said coded elements from said coding means and converting said elements into electrical signals; and d. means for utilizing the electrical signals from said output means to obtain an indication of the relative positions of the discrete elements in said pattern; the improvement wherein said coding means comprises a plurality of optical fibers, each having an end disposed in a matrix forming said input means and its opposite end connected to one of a plurality of photosensitive devices comprising said output means, said matrix being divided into columns and rows of discrete sites, with a portion having $N$ sites on a side and each site containing the ends of $n$ optical fibers, where $n$ is an even integer greater than 2 and $n/2$ fibers are used to identify the column and $n/2$ fibers are used to identify the row in which a respective site is located, said fibers being connected in different combinations to said output means, such that $nN$ photosensitive devices will produce appropriate electrical signals, indicating the column and row of any site acquiring a pattern element in a surface of $N^n$ sites.

2. Apparatus as claimed in claim 7 wherein said energy conductors comprise a plurality of optical fibers and said input surface comprises a matrix of the optical fiber ends.

3. Apparatus as claim ed in claim 2 wherein said energy sensors comprise a plurality of photosensitive devices.

4. Apparatus as claimed in claim 1 wherein said utilizing means comprises a cathode ray oscilloscope, and a discriminator circuit producing output voltages in response to said electrical signals to control the display on said cathode ray oscilloscope.

5. Apparatus as claimed in claim 4, wherein said discriminator circuit comprises a voltage divider network comprising:

e. a chain of resistors connected in series across a voltage source;

f. a plurality of parallel circuit legs connected at equal intervals along said chain such that each circuit leg taps off a voltage whose magnitude is proportional to the position of the circuit leg in the chain and all said circuit legs connected in common to the circuit output; and g. a normally open switch in each circuit leg, each of said switches being actuated by said electrical signals in such manner that the voltage appearing at said output is indicative of the positions of the elements corresponding to said actuating signals in said pattern.

6. A coding apparatus comprising:

a. an energy input surface divided into columns and rows of discrete sites and having a portion with $N$ sites on a side;

b. a plurality of energy conductors $n$ in each site, $n/2$ of which are used to identify the row and $n/2$ of which are used to identify the column in which a respective sites lies, $n$ being an even integer greater than 2; and c. energy sensors connected in different combinations to said energy conductors such that $nN$ sensors will produce an output indicating the row and column of any site receiving energy in a surface of $N^n$ sites.

7. A diagnostic radiation detecting system comprising:

a. a scintillation screen for converting a radiation pattern into a light pattern;

b. an optical fiber matrix with its input ends adjacent said scintillation screen for receiving and separating the light pattern into discrete elements and transmitting the elements in accordance with their relative positions in said pattern, said matrix comprising:

i. a plurality of unit areas arranged in columns and rows to form an input surface with a portion having $N$ unit areas on a side;

ii. an even number n of fiber ends in each unit area, $n/2$ of which are used to identify the column and $n/2$ of which are used to identify the row in which a respective unit area is located, $n$ being greater than two;

c. $nN$ photomultiplier tubes connected at the output ends of said optical fiber matrix in coded combinations for receiving the light elements and converting them into electrical signals;

d. a decoding circuit actuated in response to said electrical signals for producing output voltages indicative of the relative position in said pattern of the light signals corresponding to said electrical signals; and e. a cathode ray oscilloscope controlled by said output voltage for producing a visual display corresponding to said pattern.

8 The method of coding a radiant energy pattern comprising the steps of:

a. dividing the pattern into columns and rows of discrete sites and having at least $N$ sites on a side;

b. drawing off any energy present at each site in n portions, $n/2$ of which are used to identify the row and $n/2$ of which are used to identify the column in which a respective site is located, $n$ being an even integer greater than 2; and c. conducting said portions in different combinations to a plurality of signal stations such that $nN$ signal stations may be used to indicate the row and column of any site from which energy has been drawn in a surface of $N^n$ sites.

9. The method of claim 8, comprising the steps of:

d. converting said energy portions at said signal stations into electrical signals; and e. analyzing the electrical signals to obtain an indication of the relative positions of the discrete sites in said pattern from which energy has been drawn.

10. The method of claim 9, including the step of amplifying said electrical signals.

11. The method of claim 9, including the step of storing said electrical signals.

12. The method of claim 8 wherein the energy is produced by radiation selected from the group consisting of X-rays, gamma rays, light, charged particles and neutral particles.

13. Apparatus as in claim 2, wherein the optical fibers in said matrix are circular in cross-section and each fiber is in contact with all its adjacent fibers.

14. Apparatus as in claim 7, wherein said scintillation screen comprises a plate of NaI(Tl).

* * * * *

UNITED STATES PATENT OFFICE
CERTIFICATE OF CORRECTION

Patent No. 3,652,855 Dated May 19, 1972

Inventor(s) John Armin McIntyre

It is certified that error appears in the above-identified patent and that said Letters Patent are hereby corrected as shown below:

On the cover page, column 1, item 72, please note that the address of the inventor, John Armin McIntyre, is incorrect; that is, "2316 Beistol St., Bryan, Tex. 77803" should read --2316 Bristol St., Bryan Tex. 77803--.

Signed and sealed this 1st day of August 1972.

(SEAL)
Attest:

EDWARD M.FLETCHER,JR.
Attesting Officer

ROBERT GOTTSCHALK
Commissioner of Patents

UNITED STATES PATENT AND TRADEMARK OFFICE

CERTIFICATE OF CORRECTION

PATENT NO. : 3,652,855

DATED : March 28, 1972

INVENTOR(S) : JOHN ARMIN McINTYRE & DWIGHT PROFFER SAYLOR

It is certified that error appears in the above-identified patent and that said Letters Patent are hereby corrected as shown below:

Claim 2, line 1, change the dependency from "claim 7" to --claim 6--.

Claim 3, line 1, change "claim ed" to --claimed--.

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*